United States Patent
Sun et al.

(10) Patent No.: US 10,904,767 B2
(45) Date of Patent: Jan. 26, 2021

(54) FREQUENCY BAND SHARING METHOD, APPARATUS, AND SYSTEM

(71) Applicant: HUAWEI TECHNOLOGIES CO., LTD., Guangdong (CN)

(72) Inventors: Jingyuan Sun, Shenzhen (CN); Lixia Xue, Beijing (CN); Jiafeng Shao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 15/686,669

(22) Filed: Aug. 25, 2017

(65) Prior Publication Data
US 2017/0374559 A1 Dec. 28, 2017

Related U.S. Application Data

(63) Continuation of application No. PCT/CN2015/073405, filed on Feb. 28, 2015.

(51) Int. Cl.
*H04W 16/14* (2009.01)
*H04W 28/02* (2009.01)

(52) U.S. Cl.
CPC ....... *H04W 16/14* (2013.01); *H04W 28/0252* (2013.01)

(58) Field of Classification Search
CPC ............. H04W 16/14; H04W 72/0453; H04W 72/0446; H04W 72/042; H04W 88/02;
(Continued)

(56) References Cited

U.S. PATENT DOCUMENTS

| 2012/0129522 A1* | 5/2012 | Kim ................. H04W 72/0426 455/434 |
| 2013/0039171 A1 | 2/2013 | Gaal et al. |

(Continued)

FOREIGN PATENT DOCUMENTS

| CN | 102340777 | 2/2012 |
| CN | 102651869 A | 8/2012 |

(Continued)

OTHER PUBLICATIONS

Notice of Reason(s) for Rejection, dated Nov. 6, 2018, in Japanese Application No. 2017545243 (7 pp.).

(Continued)

*Primary Examiner* — Awet Haile
(74) *Attorney, Agent, or Firm* — Kilpatrick Townsend & Stockton LLP (57) ABSTRACT

The method in the embodiment of the present invention includes: determining a shared frequency band, and a cell of the shared frequency band is a secondary serving cell of UE1 that performs communication by using the first network and a secondary serving cell of UE2 that performs communication by using the second network, and both the UE1 and the UE2 can work on the shared frequency band and at least one other frequency band than the shared frequency band; and transmitting only a common signal of the second network on the shared frequency band when service transmission of the first network is performed on the shared frequency band.

13 Claims, 2 Drawing Sheets

(58) Field of Classification Search
CPC ..... H04W 24/10; H04W 88/06; H04W 72/14; H04W 74/006; H04W 28/26; H04W 72/082; H04W 72/1215; H04W 72/04; H04W 72/048; H04W 88/10; H04W 36/0069; H04W 52/243; H04W 16/10; H04L 5/0048; H04L 5/001; H04L 5/0023; H04L 5/0073; H04L 5/0092
See application file for complete search history.

(56) References Cited

U.S. PATENT DOCUMENTS

| | | | |
|---|---|---|---|
| 2013/0128840 A1 | 5/2013 | Sun et al. | |
| 2013/0208587 A1 | 8/2013 | Bala et al. | |
| 2013/0322371 A1 | 12/2013 | Prakash et al. | |
| 2014/0086194 A1 | 3/2014 | Sugahara | |
| 2014/0161002 A1 | 6/2014 | Gauvreau et al. | |
| 2014/0226609 A1 | 8/2014 | Hooli et al. | |
| 2014/0378157 A1* | 12/2014 | Wei | H04W 16/14 455/454 |
| 2015/0050939 A1* | 2/2015 | Futaki | H04B 17/318 455/452.1 |
| 2015/0280847 A1* | 10/2015 | Somasundaram | H04J 11/0056 370/252 |
| 2015/0289141 A1* | 10/2015 | Ghasemzadeh | H04W 16/14 370/330 |
| 2016/0337090 A1 | 11/2016 | Gauvreau et al. | |
| 2018/0220303 A1* | 8/2018 | Futaki | H04W 16/32 |

FOREIGN PATENT DOCUMENTS

| | | |
|---|---|---|
| CN | 103222295 A | 7/2013 |
| CN | 103460740 | 12/2013 |
| CN | 103533552 A | 1/2014 |
| CN | 103596183 A | 2/2014 |
| CN | 103703808 A | 4/2014 |
| CN | 103765824 A | 4/2014 |
| CN | 103841564 | 6/2014 |
| CN | 104380819 | 2/2015 |
| EP | 1220557 | 7/2002 |
| EP | 2916574 A1 | 9/2015 |
| JP | 2014508468 A | 4/2014 |
| JP | 2015508958 A | 3/2015 |
| WO | WO2013112983 | 8/2013 |
| WO | WO2013131257 | 9/2013 |

OTHER PUBLICATIONS

Office Action, dated Nov. 1, 2018, in Chinese Application No. 201580002114.2 (6 pp.).
Extended European Search Report, dated Feb. 2, 2018, in European Application No. 15882977.0 (7 pp.).
International Search Report, dated May 28, 2015, in International Application No. PCT/CN2015/073405 (4 pp.).
Written Opinion of the International Searching Authority, dated May 28, 2015, in International Application No. PCT/CN2015/073405 (7 pp.).

* cited by examiner

FREQUENCY BAND SHARING METHOD, APPARATUS, AND SYSTEM

CROSS-REFERENCE TO RELATED APPLICATIONS

This application is a continuation of International Application No. PCT/CN2015/073405, filed on Feb. 28, 2015, the disclosure of which is hereby incorporated by reference in its entirety.

TECHNICAL FIELD

The present invention relates to the communications field, and in particular, to a frequency band sharing method, apparatus, and system.

BACKGROUND

With the development of wireless communications, wireless communications requirements are increasingly high, data traffic and rate requirements are increasingly large, and spectrum resource requirements are sharply expanded. However, a spectrum resource is not an inexhaustible common resource, and therefore, it is essential to improve spectrum utilization as much as possible.

In a wireless communications system, a Universal Mobile Telecommunications System (UMTS, Universal Mobile Telecommunications System) is widely used, and a Long Term Evolution (LTE, Long Term Evolution) technology is gradually used. Some frequency bands are frequency bands that can be used in the UMTS and can also be used in the LTE. However, a service of the LTE and a service of the UMTS are mutually independent. When a traffic volume of the UMTS is low, a traffic volume of the LTE may be quite high, and even a spectrum is insufficient, or a spectrum is limited. Consequently, service quality deteriorates. Similarly, when the traffic volume of the LTE is low, the traffic volume of the UMTS may be quite high, and even a spectrum is insufficient, or a spectrum is limited. Consequently, service quality deteriorates. The LTE and the UMTS may share one frequency band in a time-sharing manner, so that both UE of the LTE and UE of the UMTS have good data experience.

In the prior art, whether the shared frequency band is used by the LTE or the UMTS is determined according to a measurement result and a service requirement of the UE. When the LTE uses the shared frequency band, the UMTS does not use the shared frequency band; when the UMTS uses the shared frequency band, the LTE does not use the shared frequency band. However, when the shared frequency band is switched from being used as a frequency band of an original network to being used as a frequency band of another network, because UE in the original network still performs various measurements on the shared frequency band, switching the shared frequency band causes incorrect measurement and interruption of a connection of the UE. To ensure service continuity for the UE, the UE for which a network service is provided on the shared frequency band needs to be handed over to another frequency band before the shared frequency band is switched, and then the shared frequency band can be switched to the another network. In addition, when the shared frequency band is reused in the original network, the UE needs to access the shared frequency band again in a handover manner. Because it takes a relatively long time to hand over the UE to another frequency band or hand over the UE to the shared frequency band, it takes a relatively long time for the UE to disconnect from or establish a connection to the shared frequency band. In addition, a service of the original UE may be interrupted in the handover process. Consequently, utilization of the shared frequency band is low.

SUMMARY

Embodiments of the present invention provide a frequency band sharing method, apparatus, and system, so that utilization of a shared frequency band can be effectively improved.

According to a first aspect, the present invention provides a frequency band sharing method, where the method may mainly include:

determining a shared frequency band, where the shared frequency band is a frequency band that can be used for a first network or a second network, a cell of the shared frequency band is a secondary serving cell of user equipment UE1 that performs communication by using the first network and a secondary serving cell of user equipment UE2 that performs communication by using the second network, and both the UE1 and the UE2 can work on the shared frequency band and at least one other frequency band than the shared frequency band; and determining that service transmission of the first network or service transmission of the second network is performed on the shared frequency band if there is a to-be-transmitted service in both the first network and the second network, and transmitting only a common signal of the second network on the shared frequency band when the service transmission of the first network is performed on the shared frequency band, or transmitting only a common signal of the first network or no signal on the shared frequency band when the service transmission of the second network is performed on the shared frequency band.

In a first possible implementation of the first aspect, the transmitting only a common signal of the first network or no signal on the shared frequency band specifically includes: transmitting no signal of the first network on the shared frequency band when multiple downlink carriers that include the shared frequency band and one uplink carrier that corresponds to the multiple downlink carriers are configured for all UE1s that perform communication by using the first network and whose secondary serving cell is the cell of the shared frequency band; or transmitting the common signal of the first network on the shared frequency band when the shared frequency band and one uplink carrier that independently corresponds to the shared frequency band are configured for any UE1 that performs communication by using the first network and whose secondary serving cell is the cell of the shared frequency band.

With reference to the first aspect or the first possible implementation of the first aspect, in a second possible implementation, the first network is a UMTS, and the second network is an LTE; and the transmitting only a common signal of the second network on the shared frequency band when the service transmission of the first network is performed on the shared frequency band specifically includes: transmitting a data signal of the UMTS on the shared frequency band, and transmitting one or more of a DRS, a CRS, an SS, or a PBCH of the LTE on the shared frequency band; or the transmitting only a common signal of the first network on the shared frequency band when the service transmission of the second network is performed on the shared frequency band specifically includes: transmitting a data signal of the LTE on the shared frequency band, and transmitting one or more of an SS, a CCPCH, or a CPICH of the UMTS on the shared frequency band.

With reference to the second possible implementation of the first aspect, in a third possible implementation, when the service transmission of the first network is performed on the shared frequency band, and only the DRS of the second network is transmitted on the shared frequency band, the method further includes:

skipping configuring a CRS-based measurement of the UE2; and/or transmitting the data signal of the first network on the shared frequency band in a compressed mode in a time unit of transmitting the DRS, where the DRS is a long-period DRS; and/or a transmit power at which the data signal and/or the common signal are/is transmitted in the first network in the time unit of transmitting the DRS is less than a transmit power in another time unit, where the common signal includes one or more of the SS, the CCPCH, or the CPICH; and/or skipping transmitting one or more of the SS, the CCPCH, or the CPICH of the first network in the time unit of transmitting the DRS; and/or configuring a measurement interval for the UE2, and skipping transmitting the DRS on the shared frequency band in the measurement interval.

With reference to the second possible implementation or the third possible implementation of the first aspect, in a fourth possible implementation, the DRS transmitted in the time unit of transmitting the DRS does not include the CRS.

With reference to any one of the first aspect, or the first to the fourth possible implementations of the first aspect, in a fifth possible implementation, before a step of determining the shared frequency band, the method further includes:

handing over another user equipment that performs communication by using the first network and can work on only one shared frequency band to another frequency band; and/or handing over another user equipment that performs communication by using the second network and can work on only one shared frequency band to another frequency band.

With reference to any one of the first aspect, or the first to the fifth possible implementations of the first aspect, in a sixth possible implementation, the determining that service transmission of the first network or service transmission of the second network is performed on the shared frequency band specifically includes: determining, according to a traffic volume of the first network and a traffic volume of the second network, that the service transmission of the first network or the service transmission of the second network is performed on the shared frequency band, specifically including:

determining that the service transmission of the first network is performed on the shared frequency band when the traffic volume of the first network exceeds a first threshold, and/or the traffic volume of the second network does not exceed a second threshold;

determining that the service transmission of the second network is performed on the shared frequency band when the traffic volume of the first network does not exceed the first threshold, and/or the traffic volume of the second network exceeds the second threshold; or when the traffic volume of the first network exceeds the first threshold, and the traffic volume of the second network exceeds the second threshold, determining that the service transmission of the first network is performed on the shared frequency band if it is determined that a ratio of the traffic volume of the first network to the traffic volume of the second network exceeds a third threshold, or determining that the service transmission of the second network is performed on the shared frequency band if it is determined that the ratio of the traffic volume of the first network to the traffic volume of the second network does not exceed the third threshold.

With reference to any one of the first aspect, or the first to the fifth possible implementations of the first aspect, in a sixth possible implementation, the transmitting only a common signal of the second network on the shared frequency band when the service transmission of the first network is performed on the shared frequency band specifically includes: activating the first network to work on the shared frequency band, and deactivating the second network from working on the shared frequency band or configuring the second network to be in an OFF state on the shared frequency band; and the transmitting only a common signal of the first network or no signal on the shared frequency band when the service transmission of the second network is performed on the shared frequency band specifically includes: activating the second network to work on the shared frequency band or configuring the second network to be in an ON state on the shared frequency band, and/or deactivating the first network from working on the shared frequency band.

According to a second aspect, the present invention provides a frequency band sharing apparatus, where the apparatus may specifically include:

a determining unit, configured to determine a shared frequency band, where the shared frequency band is a frequency band that can be used for a first network or a second network;

a configuration unit, configured to configure the shared frequency band as a secondary serving cell of user equipment UE1 that performs communication by using the first network and a secondary serving cell of user equipment UE2 that performs communication by using the second network, where both the UE1 and the UE2 can work on the shared frequency band and at least one other frequency band than the shared frequency band; and a processing unit, configured to: determine that service transmission of the first network or service transmission of the second network is performed on the shared frequency band if there is a to-be-transmitted service in both the first network and the second network, and transmit only a common signal of the second network on the shared frequency band when the service transmission of the first network is performed on the shared frequency band, or transmit only a common signal of the first network or no signal on the shared frequency band when the service transmission of the second network is performed on the shared frequency band.

In a first possible implementation of the second aspect, the processing unit is specifically configured to: transmit no signal of the first network on the shared frequency band when multiple downlink carriers that include the shared frequency band and one uplink carrier that corresponds to the multiple downlink carriers are configured for all UE1s that perform communication by using the first network and whose secondary serving cell is a cell of the shared frequency band; or transmit the common signal of the first network on the shared frequency band when the shared frequency band and one uplink carrier that independently corresponds to the shared frequency band are configured for any UE1 that performs communication by using the first network and whose secondary serving cell is the cell of the shared frequency band.

With reference to the second aspect, or the first possible implementation of the second aspect, in a second possible implementation, the first network is a UMTS, and the second network is an LTE; and the processing unit is specifically configured to: transmit a data signal of the UMTS on the shared frequency band, and transmit one or more of a DRS, a CRS, an SS, or a PBCH of the LTE on the shared frequency band; or transmit a data signal of the LTE on the shared frequency band, and transmit one or more of an SS, a CCPCH, or a CPICH of the UMTS on the shared frequency band.

With reference to the second aspect, or the first or the second possible implementation of the second aspect, in a third possible implementation, the apparatus may further include: a handover unit, configured to: hand over another user equipment that performs communication by using the first network and can work on only one shared frequency band to another frequency band and/or hand over another user equipment that performs communication by using the second network and can work on only one shared frequency band to another frequency band.

According to a third aspect, the present invention provides a frequency band sharing system, where the system may mainly include the frequency band sharing apparatus provided in the second aspect.

It may be learned from the foregoing technical solutions that the embodiments of the present invention have the following advantages.

In the embodiments of the present invention, a cell of a shared frequency band is a secondary serving cell of UE that performs communication by using a first network and a secondary serving cell of the UE that performs communication by using a second network, and UEs of the two networks can work on the shared frequency band and at least one other frequency band than the shared frequency band. When the shared frequency band is switched between the two networks, because UE of an original network receives only a common signal on the shared frequency band, and a cell of the shared frequency band is a secondary serving cell of the UE of the original network, service continuity of the UE of the original network can be ensured without a need of handing over the UE to another frequency band. Therefore, sharing of the shared frequency band between the first network and the second network is effectively implemented, switching between the two networks may be rapidly completed, and utilization of the shared frequency band is effectively improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Embodiments of the present invention provide a frequency band sharing method, so that sharing of a shared frequency band between a first network and a second network may be effectively implemented, switching between the two networks may be rapidly completed, and spectrum utilization is improved. In addition, a frequency band sharing apparatus and a corresponding frequency band sharing system are further provided, and reference may be made to FIG. 1 to FIG. 4. The following separately gives detailed descriptions with reference to the specific embodiments.

A frequency band sharing method provided by the embodiments of the present invention may be applicable to a wireless communications system, and is specifically a frequency band sharing method for switching a shared frequency band between two different wireless communications systems, and the two networks may share the shared frequency band in a time-sharing manner. For ease of description, the frequency band sharing method is described from a perspective of the frequency band sharing apparatus. For example, the frequency band sharing apparatus may be specifically a network controller. The network controller may learn a service requirement, a measurement result, or the like of UE1 in the first network and a service requirement, a measurement result, or the like of UE2 in the second network, so that whether the shared frequency band is used by the first network or the second network is determined by means of coordination. The frequency band sharing method may be applicable to the first network and the second network that are covered by one or more base stations.

Figure 1:
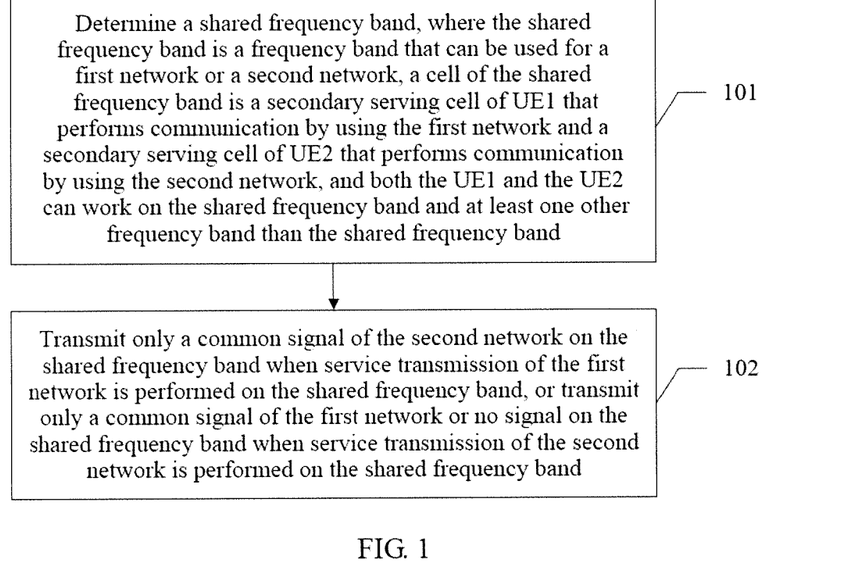
FIG. 1 is a schematic flowchart of a frequency band sharing method according to an embodiment of the present invention.

Referring to FIG. 1, FIG. 1 is a schematic flowchart of a frequency band sharing method according to an embodiment of the present invention, and the method may specifically include the following steps.

Step 101: Determine a shared frequency band, where the shared frequency band is a frequency band that can be used for a first network or a second network, a cell of the shared frequency band is a secondary serving cell of user equipment UE1 that performs communication by using the first network and a secondary serving cell of user equipment UE2 that performs communication by using the second network, and both the UE1 and the UE2 can work on the shared frequency band and at least one other frequency band than the shared frequency band.

For ease of description, in the present invention, user equipment that performs communication by using the first network is described as UE1, and user equipment that performs communication by using the second network is described as UE2, where the UE1 and the UE2 may be same LTE or different UEs.

The shared frequency band may be used to perform communication in the first network or the second network, and the shared frequency band may be configured as the secondary serving cell of the UE1 and the secondary serving cell of the UE2 after the shared frequency band is determined. One frequency band in other frequency bands on which the UE1 may work is configured as a primary serving cell, and similarly, one frequency band in other frequency bands on which the UE2 may work is configured as a primary serving cell.

To ensure both the UE1 and the UE2 can work on the shared frequency band and at least one other frequency band than the shared frequency band, before step 101, the method may further include: handing over another user equipment that performs communication by using the first network and can work on only one shared frequency band to another frequency band; and/or handing over another user equipment that performs communication by using the second network and can work on only one shared frequency band to another frequency band.

Step 102: Determine that service transmission of the first network or service transmission of the second network is performed on the shared frequency band if there is a to-be-transmitted service in both the first network and the second network, and transmit only a common signal of the second network on the shared frequency band when the service transmission of the first network is performed on the shared frequency band, or transmit only a common signal of the first network or no signal on the shared frequency band when the service transmission of the second network is performed on the shared frequency band.

If there is a to-be-transmitted service in both the first network and the second network, a network that uses the shared frequency band may be determined according to a traffic volume of the first network and a traffic volume of the second network, or a network that uses the shared frequency band may be determined according to an radio resource measurement (RRM) measurement result of the UE1 of the first network and an RRM measurement result of the UE2 of the second network. In addition, the foregoing determining may further be performed according to a service of the first network and a service of the second network, such as a service priority, a traffic volume size, a service urgency level, a service quality requirement, a service type, and a quantity of served users.

In an implementation, the first network may be a Universal Mobile Telecommunications System (UMTS, Universal Mobile Telecommunications System), and the second network may be a Long Term Evolution (LTE, Long Term Evolution) technology or LTE-A. In this embodiment of the present invention, that the method is applied to the LTE/LTE-A wireless communications system and the UMTS wireless communications system is used as an example to analyze and describe the method, and does not constitute any limitation on the present invention.

In the LTE system, ON/OFF of a cell is introduced in Release 12. In this case, a cell may properly serve UE when the cell is in an ON state, that is, various service data, common signals, and common channels may be transmitted, where the common signals and channels include: a cell-specific reference signal (CRS, Cell-specific Reference Signal), a synchronization signal (SS, Synchronization Signal), and a physical broadcast channel (PBCH, Physical Broadcast Channel), where the CRS, the SS, and the PBCH are periodically transmitted (the reason why the cell transmits these signals is that the UE performs some measurements and receives some necessary signaling). However, a cell may transmit only a long-period dedicated reference signal (DRS, Dedicated Reference Signal) when the cell is in an OFF state. The ON/OFF of the cell may be selected according to a change of a service requirement and an RRM measurement result on each carrier. The UE may perform a measurement according to the CRS or the DRS when the cell is in an ON state, or the UE may perform the RRM measurement only according to the DRS when the cell is in an OFF state.

Carrier aggregation (CA, Carrier Aggregation) is introduced in Release 10, so that UE that supports the CA may be simultaneously served by at least two carriers, and each carrier has a serving cell, where a cell on one carrier is used as a primary serving cell Pcell (the Pcell is a cell that is first accessed by the UE, and another carrier may be configured for the UE by using the Pcell), and a cell on another carrier is used as a secondary serving cell Scell. The Pcell cannot be deactivated. The Scell can be activated and deactivated. It takes some time for the UE to make preparations (such as device parameter adjustment and synchronization) for each activation before the UE can start to receive data for transmission from the Scell. When the Scell is activated, the Scell may properly serve the UE like a cell in an ON state, that is, various service data, and common signals or channels such as the CRS/SS/PBCH may be transmitted. However, when the Scell is deactivated, the Scell can transmit only common signals or channels, such as the CRS, the SS, or the PBCH. This is different from a cell in an OFF state that transmits only the DRS. Activation/deactivation of the Scell may be selected according to a change of a service requirement and/or an RRM measurement result on each carrier. The activation/deactivation may also be selected according to the change of the service requirement and/or an RRM measurement result of each cell. The UE may perform the RRM measurement according to the CRS or the DRS.

The ON/OFF of a cell is not introduced in a UMTS system, but there is design that is similar to the CA, that is, a dual cell (DC, Dual Cell), where a cell on one carrier is used as a Pcell of UE, and a cell on at least one other carrier is configured as an Scell of the UE (that is, a secondary serving HS-DSCH cell). Physical layer signaling is used in activation or deactivation of the UMTS, the UE may receive a downlink signal and start to be served between 4 ms (when only one uplink carrier is configured for the UE) and 6 ms (when multiple uplink carriers are configured for the UE) after the Scell is activated. When the Scell is deactivated, if multiple downlink carriers and one uplink carrier that corresponds to the multiple downlink carriers are configured for the UE, except a Pcell in the multiple downlink carriers, when each Scell does not serve UE of which the Scell independently corresponds to one uplink carrier, the downlink Scell may transmit no signal; or if there is only one downlink carrier that corresponds to at least one uplink carrier that is configured for the UE, even if the carrier does not serve any UE, common signals or channels such as a synchronization signal (SS, Synchronization Signal), a common pilot channel (CPICH, Common Pilot Channel), and a common control physical channel (CCPCH, Common Control Physical Channel) need to be transmitted. However, only a small part of the transmit power is occupied to transmit the SS/CCPCH/CPICH, and most of the transmit power is used to transmit data. The activation/deactivation of the Scell may be performed according to the change of the service requirement, or the like.

That the first network is an UMTS, and the second network is an LTE is used as an example to describe this embodiment of the present invention in detail in the following.

First, a shared frequency band of the UMTS and the LTE is determined.

The shared frequency band may be used to perform communication in the UMTS or the LTE. It should be noted that, frequency bands in the UMTS and the LTE exist in a form of a carrier, which are a carrier of the LTE and a carrier of the UMTS respectively.

There may be one or more shared frequency bands of the UMTS and the LTE. For example, the shared frequency band may be one or more of 5 MHz, 10 MHz, 15 MHz, or 20 MHz. If there is one shared frequency band in the UMTS and the LTE, the shared frequency band may be 5 MHz; or there may be two shared frequency bands, which are 5 MHz and 10 MHz respectively; or there may be three shared frequency bands, which are 5 MHz, 10 MHz, and 20 MHz respectively; and so on. In this embodiment of the present invention, that the shared frequency band of the UMTS and the LTE is 5 MHz is used as an example for detailed description, and does not constitute any limitation on the present invention. A user that can support only one carrier is handed over to another cell or carrier in the UMTS and the LTE, so that only UMTS UE that supports DC and LTE UE that supports CA may use the 5 MHz frequency band.

The UMTS UE (described as UE1 in the following for ease of description) and the LTE UE (described as UE2 in the following for ease of description) may work at 5 MHz. In addition, the UE1 may work on the shared frequency band and at least one other frequency band than the shared frequency band, and the UE2 may work on the shared frequency band and at least one other frequency band than the shared frequency band. To ensure that only the UE1 that supports the DC and the UE2 that supports the CA may use the shared frequency band, another user equipment that can support only one frequency band is handed over to another cell or frequency band.

The shared frequency band may be configured as a secondary serving cell Scell of the UE1, a cell of any frequency band in other frequency bands on which the UE1 may work is a primary serving cell Pcell of the UE1, where the Scell and the Pcell may be covered by a same base station, and coverage areas of the Scell and the Pcell are basically the same. Similarly, the shared frequency band may be configured as a secondary serving cell Scell of the UE2, a cell of any frequency band in other frequency bands on which the UE2 may work is a primary serving cell Pcell of the UE2. The Scell and the Pcell may be covered by a same base station, and coverage areas of the Scell and the Pcell are basically the same.

According to the foregoing method, that a service is transmitted in two networks on the shared frequency band in a time-sharing manner can be ensured. For a network in which a service is not transmitted on the shared frequency band, a common signal may be or may not be transmitted in a specific manner according to a need, so as to ensure that a measurement of the UE is not interrupted. Therefore, the UE does not disconnect from the shared frequency band because the shared frequency band is not used for a network standard in which the UE performs communication, and does not re-establish a connection to the shared frequency band because the shared frequency band is reused for the network standard in which the UE performs communication. Steps of disconnecting from the network and reconnecting to the network do not need to be repeatedly performed, and time may be available for service transmission, so that time available for service transmission on the shared frequency band is longer, and spectrum utilization is effectively improved.

Figure 2:
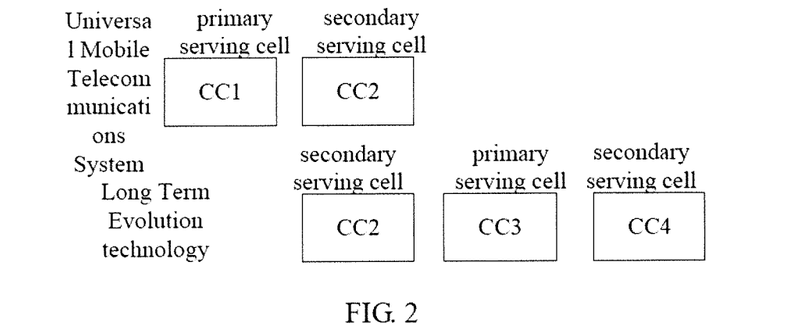
FIG. 2 is a schematic diagram of a configuration manner according to an embodiment of the present invention.

Referring to FIG. 2, FIG. 2 is a schematic diagram of a configuration manner according to an embodiment of the present invention. In FIG. 2, a CC2 represents a cell of a 5 MHz shared frequency band, and a CC1, a CC3, and a CC4 are independent frequency bands of two networks, where the CC1 represents a 10 MHz cell, the CC3 represents a 10 MHz cell, and the CC4 represents a 10 MHz cell.

Then, that service transmission is performed by a UMTS or an LTE on the shared frequency band is determined.

If there is a to-be-transmitted service in both the first network and the second network, a network that uses the shared frequency band needs to be determined. For example, determining may be performed according to the service of the first network and the service of the second network, such as a service priority, a traffic volume size, a service urgency level, a service quality requirement, a service type, or a quantity of served users.

That service transmission of the first network or service transmission of the second network is performed on the shared frequency band is determined according to a traffic volume of the first network and a traffic volume of the second network specifically includes:

determining that the service transmission of the first network is performed on the shared frequency band when the traffic volume of the first network exceeds a first threshold, or the traffic volume of the second network does not exceed a second threshold, or when the traffic volume of the first network exceeds the first threshold, and the traffic volume of the second network does not exceed the second threshold;

determining that the service transmission of the second network is performed on the shared frequency band when the traffic volume of the first network exceeds the first threshold, or the traffic volume of the second network exceeds the second threshold, or when the traffic volume of the first network does not exceed the first threshold, and the traffic volume of the second network exceeds the second threshold; or when the traffic volume of the first network exceeds the first threshold, and the traffic volume of the second network exceeds the second threshold, determining that the service transmission of the first network is performed on the shared frequency band if it is determined that a ratio of the traffic volume of the first network to the traffic volume of the second network exceeds a third threshold, or determining that the service transmission of the second network is performed on the shared frequency band if it is determined that the ratio of the traffic volume of the first network to the traffic volume of the second network does not exceed the third threshold.

The first threshold, the second threshold, and the third threshold may be self-defined, and this is not specifically limited in this embodiment.

If a traffic volume of the UMTS exceeds the first threshold, it indicates that there is a large traffic volume of the UMTS on the shared frequency band, and service transmission of the UMTS is performed on the shared frequency band; similarly, if a traffic volume of the LTE exceeds the second threshold, it indicates that there is a large traffic volume of the LTE on the shared frequency band, and service transmission of the LTE is performed on the shared frequency band; or if both a service requirement of the UMTS and a service requirement of the LTE are very large, whether the UMTS or the LTE works on the shared frequency band is determined by comparing a ratio of traffic volumes of the UMTS and the LTE. If a ratio of the traffic volume of the UMTS to the traffic volume of the LTE exceeds the third threshold, it is determined that the service transmission of the UMTS is performed on the shared frequency band, or if the ratio of the traffic volume of the UMTS to the traffic volume of the LTE does not exceed the third threshold, it is determined that the service transmission of the LTE is performed on the shared frequency band.

That only a common signal of the second network is transmitted on the shared frequency band when the service transmission of the first network is performed on the shared frequency band specifically includes:

activating the first network to work on the shared frequency band, and deactivating the second network from working on the shared frequency band; or activating the first network to work on the shared frequency band, and configuring the second network to be in an OFF state on the shared frequency band.

That only a common signal of the first network or no signal is transmitted on the shared frequency band when the service transmission of the second network is performed on the shared frequency band specifically includes:

activating the second network to work on the shared frequency band, and deactivating the first network from working on the shared frequency band; or configuring the second network to be in an ON state on the shared frequency band, and deactivating the first network from working on the shared frequency band.

In one case, if it is determined that the service transmission is performed by the LTE at 5 MHz, a signal is transmitted when the LTE is in an ON state or a signal is transmitted when the LTE is in an activated state, that is, the LTE may properly transmit various service data and common signals/channels may be properly transmitted on the 5 MHz frequency band. In this case, an Scell in the UMTS is in a deactivated state, and the shared frequency band and one uplink carrier that corresponds to the shared frequency band (a downlink canner) may be configured, or multiple downlink carriers that include the shared frequency band and one uplink carrier that corresponds to the multiple downlink carriers may be configured. Specifically, on one hand, if the multiple downlink carriers that include the shared frequency band and one uplink carrier that corresponds to the multiple downlink carriers are configured for all UE1s that perform communication by using the first network and whose secondary serving cell is the cell of the shared frequency band, no signal of the UMTS may be transmitted on the 5 MHz shared frequency band; and on the other hand, if the shared frequency band and one uplink carrier that independently corresponds to the shared frequency band are configured for any UE1 that performs communication by using the first network and whose secondary serving cell is the cell of the shared frequency band, common signals or channels such as an SS, a CCPCH, and a CPICH of the UMTS are transmitted, but no other signal is transmitted on the 5 MHz shared frequency band. It may be understood that a transmit power of the SS/CCPCH/CPICH is quite low, so that when the UMTS is deactivated, interference on the LTE system that is caused by transmitting these common signals or channels on the shared frequency band is quite slight. In the UMTS, because the Scell of the shared frequency band is deactivated, no measurement is performed by the UE1 on the shared frequency band, and even if an RRM measurement is performed by the UE1 on the shared frequency band, a network controller may determine, according to a rule such as a service requirement of the UMTS, whether the shared frequency band needs to be activated as an Scell of the UE1.

In another case, if it is determined that the service transmission is performed by the UMTS at the 5 MHz, the Scell in the UMTS is ill an activated state, and various service data of the UMTS may be transmitted at the 5 MHz, and various service data may be properly received by the UE1 at the 5 MHz. In this case, the Scell in the LTE is in a deactivated state or in an OFF state, and a common signal/channel may be transmitted at the 5 MHz in the LTE according to the deactivated state or the OFF state. On one hand, if only a DRS is transmitted in the LTE according to the OFF state of the Scell, to reduce interference on the UMTS system, the DRS is a long-period DRS, a period of the DRS may be configured or adjusted, such as 40 ms, 80 ms, or 160 ms, and each transmit duration may be configured or adjusted, such as 1-5 ms. In addition, a signal that actually needs to be used in transmitting the DRS may be configured or adjusted, such as whether to transmit a CSIRS, or whether to use a CRS. In this case, to reduce impact caused by the LTE system on the UMTS system, a longer period of the DRS (for example, 160 ms), and/or shorter duration (for example, 1 ms) of the DRS, and/or that some signals are not transmitted in the DRS (for example, the CRS is not transmitted) may be configured according to a need. On the other hand, common signals and channels such as the CRS/SS/PBCH may still be transmitted in the LTE according to the deactivated state. It may be understood that, in this case, signals are transmitted on the shared frequency band in both the LTE system and the UMTS system (various service data is properly transmitted in the UMTS, and the DRS, or the CRS/SS/PBCH is transmitted in the LTE), so that mutual interference is generated. The LTE system and the UMTS system may coexist provided that the interference is within a tolerable range. Because the UMTS is an interference-limited system, interference on the UMTS that is caused by transmitting the CRS/SS/PBCH in the LTE is slight, but noise intensity increases. On the contrary, interference caused by the UMTS on the LTE is equivalent to noise or interference intensity enhancement, and therefore measurement accuracy of the LTE decreases. In some implementations, a transmit power of the LTE on the shared frequency band may be limited, so as to reduce the interference caused by the LTE on the UMTS. For example, transmitting is performed by using a transmit power that is less than a transmit power of another time unit other than the time unit of transmitting the DRS.

When the LTE is in an OFF state on the shared frequency band, to reduce interference between the UMTS and the LTE, the following may specifically include:

A. skipping configuring a CRS-based measurement of the UE2; and/or

B. transmitting a data signal of the first network on the shared frequency band in a compressed mode in the time unit of transmitting the DRS, where the DRS is a long-period DRS; and/or C. transmitting data and/or a common signal by using a reduced transmit power in the first network in the time unit of transmitting the DRS, where the common signal includes one or more of the SS, the CCPCH, or the CPICH, and for example, transmitting is performed by using a transmit power that is less than a transmit power in another time unit other than the time unit of transmitting the DRS; and/or D. skipping transmitting one or more of the SS, the CCPCH, or the CPICH of the first network in the time unit of transmitting the DRS; and/or E. configuring a measurement interval for the UE2, and skipping transmitting the DRS on the shared frequency band in the measurement interval.

One or more steps may be selected from the foregoing A, B, C, D, and E for implementation, and this is not specifically limited in the present invention.

Still further, the DRS in the time of transmitting the DRS may exclude the CRS, so that interference caused by the LTE on the UMTS may be reduced.

In the foregoing A, because the CRS-based RRM measurement of the UE2 is not configured, the CRS-based RRM measurement of the UE2 may be ignored, and the CSIRS instead of the CRS may be transmitted on the shared frequency band. Therefore, interference caused by the UMTS on transmitting the DRS by the LTE may be effectively reduced. In addition, to reduce interference on the UMTS when the DRS is transmitted, the DRS transmitted by the LTE is a long-period DRS, a transmit subframe of the DRS (for example, a long period of 160 ms is configured, and DRS duration of 1-2 ms is configured) is configured as less as possible.

In the foregoing B, service data transmitted by the UMTS on the shared frequency band is transmitted after the service data is compressed, and the UE1 performs a measurement on another frequency band in some ms after receiving a compressed data signal, but does not receive any signal on the Scell. In this case, transmitting the DRS by the LTE causes no interference on the UMTS.

In the foregoing C, the first network transmits the data and/or common signal by using a reduced transmit power in the time unit of transmitting the DRS, where the common signal includes one or more of the SS, the CCPCH, or the CPICH. For example, transmitting is performed by using a transmit power that is less than a transmit power in another time unit other than the time unit of transmitting the DRS, so that interference caused by the UMTS on the DRS of the LTE may be reduced.

In the foregoing D, one or more of the SS, the CCPCH, or the CPICH are not transmitted on the shared frequency band in the UMTS in a time period of transmitting the DRS in the LTE, and interference on transmitting the DRS by the LTE may be reduced, so that the DRS-based measurement of the UE2 is more reliable.

In the foregoing E, the measurement interval Gap is configured for the UE2, and no signal is transmitted on the shared frequency band in the LTE in the Gap, that is, the UE2 does not receive a signal of the Scell, so that any service data may be transmitted on the shared frequency band in the UMTS, without causing interference between the LTE and the UMTS.

If the LTE is in a deactivated state on the shared frequency band, to reduce the interference between the UMTS and the LTE, on one hand, if there is no DRS configuration and no DRS-related RRM measurement, and if a configured RRM measurement of the UE2 occurs when the UMTS uses the shared frequency band, an RRM measurement result of the UE2 may not be used, or may be used after an upward adjustment is performed on the RRM measurement result of the UE2, and an adjusted measurement result may be notified to the UE2. On the other hand, if there is the DRS-related RRM measurement, the interference between the UMTS and the LTE may be reduced in a manner such as transmitting the signal after the signal is compressed as described in the foregoing B, or configuring the measurement interval Gap as described in the foregoing D.

It should be noted that when the deactivated state is used in the LTE for transmitting a signal, relatively strong interference may be caused on the UMTS. Therefore, if there is a very important service or user equipment with a high priority, the LTE is preferably in the ON/OFF state. When the UE2 does not support the ON/OFF but supports the CA, the LTE may be configured to be in an activation/deactivation mode of the CA.

The shared frequency band is a secondary serving cell of the UE2, and when the secondary serving cell of the UE2 is in an OFF state or a deactivated state, the UE2 may still perform service transmission by using another frequency band (a frequency band that is configured as a primary serving cell). Similarly, the shared frequency band is a secondary serving cell of the UE1, and when the secondary serving cell of the UE1 is in a deactivated state, the UE1 may still perform service transmission by using another frequency band (a frequency band that is configured as a primary serving cell) without causing service interruption. Therefore, service continuity of the UE can be ensured.

It can be learned from the foregoing that, in this embodiment of the present invention, a cell of a shared frequency band is a secondary serving cell of UE that performs communication by using a first network and a secondary serving cell of UE that performs communication by using a second network, and the UEs of the two networks can work on the shared frequency band and at least one other frequency band than the shared frequency band. When the shared frequency band is switched between the two networks, because LTE of an original network receives only a common signal on the shared frequency band, and a cell of the shared frequency band is a secondary serving cell of the UE of the original network, service continuity of the UE of the original network can be ensured without a need of handing over the UE to another frequency band. Therefore, sharing of the shared frequency band between the first network and the second network is effectively implemented, switching between the two networks may be rapidly completed, and utilization of the shared frequency band is effectively improved.

To better implement the frequency band sharing method provided in the embodiments of the present invention, the embodiments of the present invention further provide a frequency band sharing apparatus based on the foregoing frequency band sharing method, and the frequency band sharing apparatus may be a network controller. Meanings of nouns are the same as those in the foregoing frequency band sharing method. For specific implementation details, refer to descriptions in the method embodiments.

Figure 3:
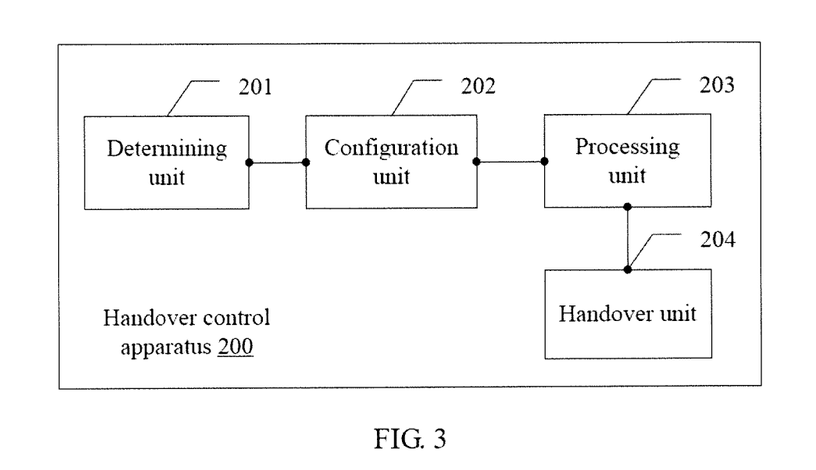
FIG. 3 is a schematic structural diagram of a frequency band sharing apparatus according to an embodiment of the present invention.

Referring to FIG. 3, FIG. 3 is a schematic structural diagram of a frequency band sharing apparatus according to an embodiment of the present invention. The frequency band sharing apparatus 200 may mainly include: a determining unit 201, a configuration unit 202, and a processing unit 203.

The determining unit 201 is configured to determine a shared frequency band, where the shared frequency band is a frequency band that can be used for a first network or a second network.

The configuration unit 202 is configured to configure the shared frequency band as a secondary serving cell of user equipment UE1 that performs communication by using the first network and a secondary serving cell of user equipment UE2 that performs communication by using the second network, where both the UE1 and the UE2 can work on the shared frequency band and at least one other frequency band than the shared frequency band.

The processing unit 203 is configured to: determine that service transmission of the first network or service transmission of the second network is performed on the shared frequency band if there is a to-be-transmitted service in both the first network and the second network, and transmit only a common signal of the second network on the shared frequency band when the service transmission of the first network is performed on the shared frequency band, or transmit only a common signal of the first network or no signal on the shared frequency band when the service transmission of the second network is performed on the shared frequency band.

In some implementations, the processing unit 203 is specifically configured to: transmit no signal of the first network on the shared frequency band when multiple downlink carriers that include the shared frequency band and one uplink carrier that corresponds to the multiple downlink carriers are configured for all UE1s that perform communication by using the first network and whose secondary serving cell is a cell of the shared frequency band; or transmit the common signal of the first network on the shared frequency band when the shared frequency band and one uplink carrier that independently corresponds to the shared frequency band are configured for any UE1 that performs communication by using the first network and whose secondary serving cell is the cell of the shared frequency band.

In some implementations, the first network is a UMTS, and the second network is an LTE. Then, correspondingly, the processing unit 203 is specifically configured to: transmit a data signal of the UMTS on the shared frequency band, and transmit one or more of a DRS, a CRS, an SS, or a PBCH of the LTE on the shared frequency band; or transmit a data signal of the LTE on the shared frequency band, and transmit one or more of an SS, a CCPCH, or a CPICH of the UMTS on the shared frequency band.

Still further, the frequency band sharing apparatus may further include a handover unit 204, where the handover unit 204 is configured to: hand over another user equipment that performs communication by using the first network and can work on only one shared frequency band to another frequency band; and/or hand over another user equipment that performs communication by using the second network and can work on only one shared frequency band to another frequency band.

In the foregoing embodiments, the description of each embodiment has respective focuses. For a part that is not described in detail in an embodiment, reference may be made to related descriptions in other embodiments.

Figure 4:
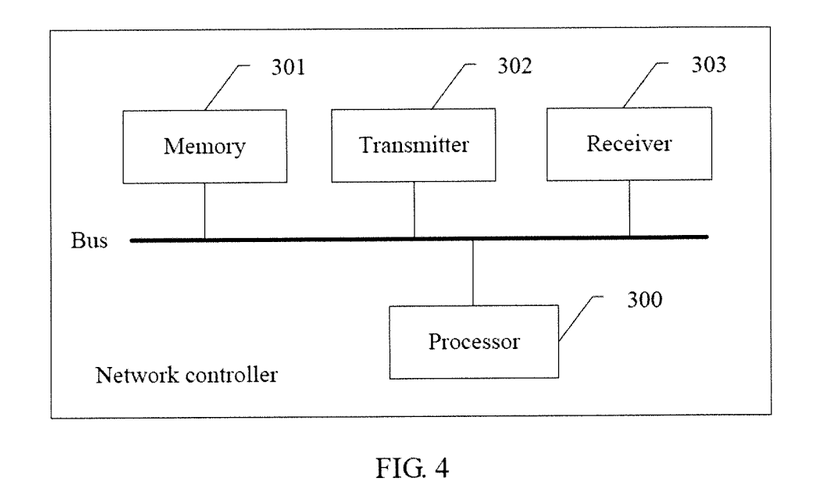
FIG. 4 is a schematic structural diagram of a network controller according to an embodiment of the present invention.

In addition, the present invention further provides a network controller, that is, the frequency band sharing apparatus described in the foregoing embodiments. The network controller is deployed in the first network and the second network, and a schematic structural diagram is shown in FIG. 4. The network controller includes a processor 300 that connects to a bus, and the network controller may further include a memory 301, a transmitter 302, a receiver 303, and the like.

The memory 301 is configured to store information such as necessary files of data that is processed by the processor 300, for example, program code. In this embodiment, the program code stored in the memory 301 is used to implement the foregoing frequency band sharing method, and the program code is executed by the processor 300.

The processor 300 is configured to: determine a shared frequency band, where the shared frequency band is a frequency band that can be used to serve a first network or a second network, where a cell of the shared frequency band is a secondary serving cell of user equipment UE1 that performs communication by using the first network and a secondary serving cell of user equipment UE2 that performs communication by using the second network, and both the UE1 and the UE2 can work on the shared frequency band and at least one other frequency band than the shared frequency band; and determine that service transmission of the first network or service transmission of the second network is performed on the shared frequency band if there is a to-be-transmitted service in both the first network and the second network, and determine only a common signal of the second network on the shared frequency band when the service transmission of the first network is performed on the shared frequency band, or transmit only a common signal of the first network or no signal on the shared frequency band when the service transmission of the second network is performed on the shared frequency band.

The present invention further provides a frequency band sharing system, which mainly includes the frequency band sharing apparatus described in the foregoing embodiments. For details, refer to the foregoing embodiments, and details are not described herein again.

The technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that may store program code, such as a USB flash drive, a removable hard disk, a read-only memory (ROM, Read-Only Memory), a random access memory (RAM, Random Access Memory), a magnetic disk, or an optical disc.

A frequency band sharing method, apparatus, and system provided in the present invention have been described in detail in the foregoing. In this specification, specific examples are used to describe the principle and implementations of the present invention, and the description of the foregoing embodiments is only intended to help understand the method and core idea of the present invention. In addition, a person skilled in the art may, based on the idea of the embodiments of the present invention, make modifications with respect to the specific implementations and the application scope. Therefore, the content of this specification shall not be construed as a limitation on the present invention.

What is claimed is:
1. A frequency band sharing method, comprising:
   determining a shared frequency band, wherein:
      the shared frequency band is a frequency band for a first network and a second network;
      a cell of the shared frequency band is a secondary serving cell of user equipment 1 (UE1) and a secondary serving cell of user equipment 2 (UE2);
      UE1 performs communication using the first network and UE2 performs communication using the second network; and
      both the UE1 and the UE2 use the shared frequency band and at least one other frequency band than the shared frequency band to perform communications;
   determining, according to a traffic volume of the first network and a traffic volume of the second network, that a service transmission of the first network or a service transmission of the second network is performed on the shared frequency band, wherein the determination comprises:

determining that the service transmission of the first network is performed on the shared frequency band when the traffic volume of the first network exceeds a first threshold; and determining that the service transmission of the second network is performed on the shared frequency band when the traffic volume of the first network does not exceed the first threshold; and transmitting only a common signal of the second network on the shared frequency band in response to determining that the service transmission of the first network is performed on the shared frequency band, and only a common signal of the first network on the shared frequency band in response to determining that the service transmission of the second network is performed on the shared frequency band.

2. The method according to claim 1, wherein transmitting only the common signal of the first network on the shared frequency band comprises:

transmitting the common signal of the first network on the shared frequency band when the shared frequency band and one uplink carrier that independently corresponds to the shared frequency band are configured for any UE1 performing communication using the first network and having a secondary serving cell that is the cell of the shared frequency band.

3. The method according to claim 1, wherein:

the first network is a Universal Mobile Telecommunications System (UMTS) network, and the second network is a Long Term Evolution (LTE) network; and, wherein transmitting only the common signal of the second network on the shared frequency band when the service transmission of the first network is performed on the shared frequency band comprises:

transmitting a data signal of the UMTS network on the shared frequency band, and transmitting one or more of a Dedicated Reference Signal (DRS), a Cell-specific Reference Signal (CRS), a Synchronization Signal (SS), or a Physical Broadcast Channel (PBCH) of the LTE network on the shared frequency band; and transmitting only the common signal of the first network on the shared frequency band when the service transmission of the second network is performed on the shared frequency band comprises:

transmitting a data signal of the LTE network on the shared frequency band, and transmitting one or more of an SS, a Common Control Physical Channel (CCPCH), or a Common Pilot Channel (CPICH) of the UMTS network on the shared frequency band.

4. The method according to claim 3, wherein when the service transmission of the first network is performed on the shared frequency band, and only the DRS of the second network is transmitted on the shared frequency band, the method further comprises:

skipping configuring a CRS-based measurement of the UE2;

transmitting the data signal of the first network on the shared frequency band in a compressed mode in a time unit of transmitting the DRS, wherein the DRS is a long-period DRS;

a transmit power at which a data signal and/or the common signal are/is transmitted in the first network in the time unit of transmitting the DRS is less than a transmit power in another time unit, wherein the common signal comprises one or more of the SS, the CCPCH, or the CPICH;

skipping transmitting one or more of the SS, the CCPCH, or the CPICH of the first network in the time unit of transmitting the DRS; and/or configuring a measurement interval for the UE2, and skipping transmitting the DRS on the shared frequency band in the measurement interval.

5. The method according to claim 3, wherein:

the DRS transmitted in the time unit of transmitting the DRS does not comprise the CRS.

6. The method according to claim 1, further comprising:

handing over another user equipment that performs communication by using the first network and can work on only one shared frequency band to another frequency band; and/or handing over another user equipment that performs communication by using the second network and can work on only one shared frequency band to another frequency band.

7. The method according to claim 1, wherein determining, that the service transmission of the first network or the service transmission of thr secon network is performed on the shared frequency band, further comprises:

when the traffic volume of the first network exceeds the first threshold, and the traffic volume of the second network exceeds the second threshold, determining that the service transmission of the first network is performed on the shared frequency band if it is determined that a ratio of the traffic volume of the first network to the traffic volume of the second network exceeds a third threshold, or determining that the service transmission of the second network is performed on the shared frequency band if it is determined that the ratio of the traffic volume of the first network to the traffic volume of the second network does not exceed the third threshold.

8. The method according to claim 1, wherein:

transmitting only the common signal of the second network on the shared frequency band when the service transmission of the first network is performed on the shared frequency band comprises: activating the first network to work on the shared frequency band, and deactivating the second network from working on the shared frequency band or configuring the second network to be in an OFF state on the shared frequency band; and transmitting only the common signal of the first network on the shared frequency band when the service transmission of the second network is performed on the shared frequency band specifically comprises: activating the second network to work on the shared frequency band or configuring the second network to be in an ON state on the shared frequency band, and/or deactivating the first network from working on the shared frequency band.

9. A frequency band sharing apparatus, comprising:

a processor, configured to determine a shared frequency band, wherein the shared frequency band is a frequency band for a first network and a second network; and, wherein the processor, is further configured to:

configure the shared frequency band as a secondary serving cell of user equipment 1 (UE1) and a secondary serving cell of user equipment 2 (UE2), wherein:

the UE1 performs communication using the first network both the UE1;

the UE2 performs communication using the second network; and both UE1 and UE2 using the shared frequency band and at least one other frequency band than the shared frequency band to perform communications;

determine, according to a traffic volume of the first network and a traffic volume of the second network, that a service transmission of the first network or a service transmission of the second network is performed on the shared frequency band, wherein the determination comprises:

determining that the service transmission of the first network is performed on the shared frequency band when the traffic volume of the first network exceeds a first threshold; and determining that the service transmission of the second network is performed on the shared frequency band when the traffic volume of the first network does not exceed the first threshold; and transmit only a common signal of the second network on the shared frequency band in response to determining that the service transmission of the first network is performed on the shared frequency band, and only a common signal of the first network on the shared frequency band in response to determining that the service transmission of the second network is performed on the shared frequency band.

10. The apparatus according to claim 9, wherein:
the processor is configured to: transmit the common signal of the first network on the shared frequency band when the shared frequency band and one uplink carrier that independently corresponds to the shared frequency band are configured for any UE1 performing communication using the first network and having a secondary serving cell that is the cell of the shared frequency band.

11. The apparatus according to claim 9, wherein
the first network is a Universal Mobile Telecommunications System (UMTS) network, and the second network is a Long Term Evolution (LTE) network; and
the processor is configured to:
transmit a data signal of the UMTS network on the shared frequency band, and transmit one or more of a Dedicated Reference Signal (DRS), a Cell-specific Reference Signal (CRS), a Synchronization Signal (SS), or a Physical Broadcast Channel (PBCH) of the LTE network on the shared frequency band; and
transmit a data signal of the LTE network on the shared frequency band, and transmit one or more of an SS, a Common Control Physical Channel (CCPCH), or a Common Pilot Channel (CPICH) of the UMTS network on the shared frequency band.

12. The apparatus according to claim 9, further comprising:
the processor, is further configured to: hand over another user equipment that performs communication by using the first network and can work on only one shared frequency band to another frequency band and/or hand over another user equipment that performs communication by using the second network and can work on only one shared frequency band to another frequency band.

13. A frequency band sharing system, comprising:
the frequency band sharing apparatus according to claim 9.

* * * * *

UNITED STATES PATENT AND TRADEMARK OFFICE
CERTIFICATE OF CORRECTION

PATENT NO. : 10,904,767 B2  
APPLICATION NO. : 15/686669  
DATED : January 26, 2021  
INVENTOR(S) : Jingyuan Sun et al.

Page 1 of 1

It is certified that error appears in the above-identified patent and that said Letters Patent is hereby corrected as shown below:

In the Claims

Column 18, Line 20, please delete "," after "determining".

Column 18, Line 22, please delete "thr secon" and insert --the second-- between "of" and "network".

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*